United States Patent Office 3,255,955
Patented June 14, 1966

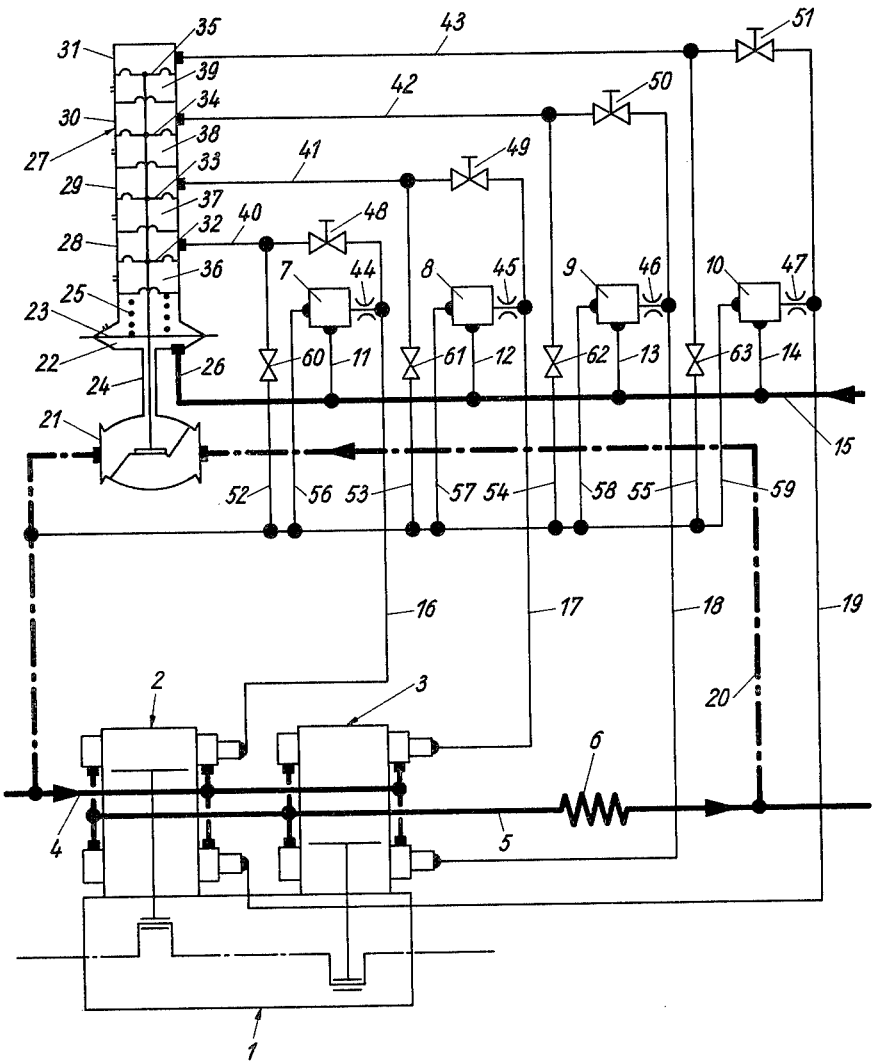

3,255,955
INFINITELY VARIABLE CAPACITY CONTROL SYSTEM FOR COMPRESSORS AND DEVICE FOR STEPLESS REGULATING ACCORDING TO THIS SYSTEM
Richard Bargmann, Vienna, Austria, assignor to Hoerbiger Ventilwerke Aktiengesellschaft, Vienna, Austria
Filed Sept. 30, 1963, Ser. No. 312,639
Claims priority, application Austria, Oct. 4, 1962,
A 7,849
8 Claims. (Cl. 230—31)

The invention relates to a system for the infinitely variable capacity control of compressors by means of a stepwise regulating system and a stepless regulating system effective within the individual stages as well as to a device for the control of the delivery of compressors according to that system, said compressors being equipped with a control appliance for the step by step variation of the capacity of the compressor and a regulating device for the infinitely variable regulation of the capacity delivered within individual regulation stages.

Compressors can be controlled by various conventional methods. For a long time, the capacity of compressors has been reduced by throttling their suction pipe, the volumetric efficiency decreasing slightly and the density of the sucked-in medium also diminishing as suction is being throttled. Likewise, a throttled by-pass has the same and by-passing from a cylinder with a partially efficient stroke (middle bore regulation) a similar effect. In addition, there is the wide range of regulating systems comprising valves leading to working chambers or clearance pockets and featuring delayed closing in harmony with the stroke cycle. These regulating systems have been considerably improved with time.

On the other hand, the majority of compressors are controlled by means of pilot valves and in addition to these two-point controls a number of appliances and switchgears for regulation by up to five steps have been devised, wherein part capacities, such as for example, individual cylinder sides, individual cylinders or parts thereof (by means of a clearance pocket) are put out of action by pneumatic stop valves or piston-operated take-off grips.

However, evolution in piston-type compressor design shows a tendency towards the use of small-sized, high-speed units frequently combined in large numbers to form composite assemblies.

Although in many cases the ordinary method of step by step regulation appears to be adequate, there still is a wide field of compressor applications, particularly for the chemical and allied industries, where infinitely variable regulation within wide limits is desirable.

Precisely such machines require a high degree of operational safety which leads to the development of conventional methods of control by throttling in by-pass and suction pipes ending in the design of fully automatic controls, thereby eliminating wear of sensitive valve elements moving in the stroke cycle.

However, the generally recurring drawback of these throttling methods resides in the fact that they entail major thermodynamic losses.

It is the object of the present invention to avoid such drawbacks as result from the combination of conventional methods of infinitely variable regulation, especially those which are suitable for higher speeds, with the stepwise switching off and on of individual cylinders or cylinder sides etc.

In fact, if a control system is first allowed to operate by infinitely variable regulation until a certain part capacity has been attained and a part capacity is switched off at the associated pressure via a suspension switch depending thereon, overriding is liable to occur as a result of the sudden decrease of the total capacity, causing objectionable oscillation of the entire unit and completely interrupting the steady regulation at this operational juncture.

It is possible though to achieve essentially infinitely variable operation also in this instance by using connecting chambers and appropriate pressure transducers. In fact, if a transducer has for example, set the control to half the rated load and now one cylinder side is switched off via a pressostat, the remaining take-off pressure is too high and with automatic control the regulator will tend to increase the capacity which had been irregularly reduced excessively. However, it is desirable for multi-stage machines of major capacities for the chemical industry, for machines operating dry in circulating gas or special media, particularly oxygen, to avoid objectionable pressure and load fluctuations caused by similar initial intermittent capacity decreases.

The system according to the invention consists in varying, during the transition from one regulating stage to the next, the restoring force for the stepless regulation in opposite direction so that overriding and oscillation is avoided and the capacity is maintained practically at a constant level during the transition from one regulating stage to the next.

Another feature of the system according to the invention resides in the fact that the transition from one regulating stage to the next and the variation of the restoring force are delayed so as to be extended for example in the case of piston-type compressors over the duration of several strokes of the piston of the compressor.

According to the invention the device for the regulation of the delivery of compressors by the system according to the invention, said compressors being equipped with a control appliance for the step by step variation of the compressor capacity and with a regulating device for the infinitely variable regulation of the quantity to be delivered within the individual regulating stages, distinguishes itself by the fact that the regulating device for the infinitely variable regulation of the quantity to be delivered is combined with an appliance for the variation of its restoring force, said appliance being controlled by the control appliance for the step by step variation of the compressor capacity.

Another feature of the device according to the invention resides in the provision of preferably manually adjustable throttles delaying the pressure variation for the operation of the control appliance and the regulating device.

Further details of the invention will appear from the following description of an embodiment of the invention with reference to the accompanying drawing schematically illustrating a piston-type compressor comprising a regulating device according to the invention.

The piston-type compressor is generally designated by reference number 1 and comprises two double-acting cylinders 2, 3. Each cylinder side is provided with an intake and an exhaust valve. The intake valves are connected with the suction pipe 4 whereas the exhaust valves communicate with the delivery pipe 5 in which a cooling coil 6 is provided. Accordingly, the compressor stepwise regulating system is of a four-stage design; each of the four suction valves of the compressor is equipped with a valve lifting device known in the art (not shown) so that by lifting one of these valves one quarter of the overall capacity of the compressor can be switched off. As a result of the lifting of a suction valve, the air sucked in by the piston during the compression stroke is returned into the suction pipe.

For the operation of the devices for the lifting of the suction valves pilot valves 7 to 10 are provided which communicate with pipe 15 subject to a control pressure, for example, to the pressure prevailing in the delivery pipe 5, via pipes 11 to 14. Via additional pipes 16 to 19 these pilot valves communicate with the devices for the lifting of the suction valves. The unit comprising the devices for the lifting of the suction valves and the pilot valves will hereafter be called "control appliance" as it serves to switch individual capacity stages of the compressor on and off depending on the pressure prevailing in the delivery pipe by lifting or releasing individual suction valves. The hit-and-miss governors are appropriately set to respond to consecutive pressure levels (pressure stages).

By means of this so-called control appliance the capacity of the compressor is regulated stepwise in the conventional manner.

In order to obtain an additional infinitely variable regulation, the compressor comprises a by-pass pipe 20 connecting the delivery side with the suction side of the compressor, the by-pass valve 21 being located in said by-pass pipe. For the control of this valve depending on the presure prevailing in the pressure pipe 15 a pressure chamber 22 comprising a wall formed by a diaphragm 23 is provided. The diaphragm 23 communicates via valve rod 24 with the closing member of the valve 21 and is pre-loaded by means of a spring 25. The pressure chamber 22 communicates with the pipe 15 via pipe 26. The valve located in the bypass pipe together with its operating device consisting of the valve stem and the pressure chamber is designated by the term "regulating device."

Depending on the pressure prevailing in the pipe 15 the by-pass valve 21 is more or less opened against the action of the spring 25 so that part of the air delivered by the compressor working at full or part capacity can flow back into the suction pipe 4.

As the upper or lower limit of a stage of the range of regulation—a certain pressure level in pipe 15—is attained, to which one of the pilot valves responds, one of the suction valves is opened or released. Thus the compressor capacity is varied by a considerable percentage within a very short period of time—in the present instance by 25 percent. This rapid variation generally entails overriding of the regulating device (valve 21 etc.) as a result of which the entire regulating device is liable to start oscillating, which is most objectionable for smooth operation.

For the purpose of eliminating this drawback, an appliance, generally designated by reference number 27, has been provided for the variation of the restoring force of the regulating device. This appliance comprises pressure chambers 28 to 31, their number being equal to that of the regulating stages (four in this instance), each of said chambers being partitioned by diaphragms 32 to 35. These diaphragms are connected with the valve stem extension 24 of the by-pass valve 21 traversing the pressure chambers. The valve stem 24 traverses the other partitions of the pressure chamber tightly sealed and with a minimum of friction. For that purpose, it is also possible to use diaphragms which should, however, be of a considerably smaller size than the diaphragms 32 to 35, but conventional packing glands will also do. Between each pressure chamber an equalizing chamber 36 to 39 communicating with the atmosphere is provided.

Each of the pressure chambers 28 to 31 communicates via a pipe 40 to 43 with one of the pilot valves 7 to 10. Consequently, the individual pressure chambers are subject to pressure if and when the pilot valve connected therewith via the said pipes respond and simultaneously lifts the associated suction valve by means of the corresponding device. The pressure now prevailing in the pressure chamber acts on the diaphragm of said chamber and provides an additional load for the valve stem 24 (in the same sense as the spring 25) and consequently, tends to additionally augment the closing force of the valve 21.

During the transition from one regulating stage to the next, as occurs when the pressure levels to which the pilot valve has been previously set, have been attained, not only is one of the suction valves lifted or released, but at the same time, the restoring force of the regulating device produced by the action of spring 25 is varied in opposition to the direction of the variation of the regulating stages. Consequently, if as a result of a decrease of the withdrawal of compressed air, pressure in the delivery side of the compressor increases and causes the gradual opening of valve 21 until the upper pressure limit of the pilot valve 7 has been attained (supposing the same to be associated with the lowest range of regulation), this pilot valve will respond and lift the associated suction valve by means of the lifting device. At the same time, the pressure chamber 28 is subjected to the pressure prevailing in the pipe 15 and will consequently increase the restoring force for the regulating valve 21. Therefore, the decrease of the compressor capacity will not, as with conventional regulating devices, be accompanied by overriding of the regulating device and oscillations, but as a result of the increase of the restoring force the regulating device will reduce the flow area of the by-pass pipe simultaneously with the reduction of capacity, thereby keeping the quantity delivered by the compressor during the transition from one regulating stage to the next practically at a constant level. The process is reversed if withdrawal of compressed air rises and pressure in the delivery side of the compressor decreases.

It has proved convenient to avoid a sudden changeover from one regulating stage to the next and consequently, an abrupt increase or decrease of the restoring force for the regulating device, and to allow for a certain period of transition, so as to remove even the slightest cause for overriding or oscillations.

In order to achieve this, throttles 44 to 47, preferably equally effective in both directions, can be incorporated in the pipes issuing from the pilot valves 7 to 10 and subsequently forming branch pipes 16 to 19 and 40 to 43 respectively. These throttles tend to check the flow of the pressure-transmitting medium (in the present instance, air), thus delaying the lifting and/or releasing of the suction valves as well as the increase of pressure or its decrease in the pressure chambers 28 to 31. For the purpose of further augmenting this effect additional throttles 48 to 51, also preferably equally effective in both directions, can be installed in the pipes leading to the pressure chambers.

To complete the picture, pipes 52 to 55 and 56 to 59 serving as vents for the pressure chambers and for the pilot valves, respectively, deserve mentioning. In the pipes serving as vents for the pressure chambers valves 60 to 63 are provided, said valves being closed during the operation of the compressor.

Obviously, the device according to the invention is in no ways restricted to the scope of the embodiment shown. For example, it is possible to substitute appropriate elements for the pilot valves in an electrically controlled system, although the penumatic system hereabove described is particularly simple in construction and maintenance. Moreover, it will be sufficient in some cases to provide for infinitely variable regulation within certain regulating stages only. Nor is it imperative that the regulating devices be equipped with a pilot valve system providing for the lifting and releasing of suction valves and with a by-pass pipe comprising a throttling member. Instead infinitely variable regulation may be assured by suction pressure control, internal backflow control (middle bore control) or by various connecting space controls in the place of an overflow throttling control system. For step by step regulation, overflow throttling controls, suction pipe check valves, pilot valves, cut-off regulating systems, internal backflow controls and clearance pocket controls can be used.

I claim:

1. A system for the infinitely variable capacity control of constant speed compressors, the combination of a stepwise regulating system comprising at least two regulating stages and a stepless regulating system effective within the individual stages and adjustable against the action of a restoring force, and means to vary the stepless regulating system in the opposite sense as to the stepwise regulating system during the transition thereof from one regulating stage to the next whereby the restoring force is varied so as to avoid overriding and oscillations and to maintain the capacity during the transition from one regulating stage to the next practically at a constant level.

2. A system for the infinitely variable capacity control of constant speed compressors, the combination of a stepwise regulating system comprising at least two regulating stages and a stepless regulating system effective within the individual stages and adjustable against the action of a restoring force, and means to vary the stepless regulating system in the opposite sense as to the stepwise regulating system during the transition thereof from one regulating stage to the next whereby the restoring force is varied so as to avoid overriding and oscillations and to maintain the capacity during the transition from one regulating stage to the next practically at a constant level, the constant speed compressor being of the piston type, and the transition from one regulating stage to the next and variation of the restoring force extend over the duration of several strokes of the piston of the constant speed compressor.

3. A system for the infinitely variable capacity control of constant speed compressors, the combination of a stepwise regulating system comprising at least two regulating stages and a stepless regulating system effective within the individual stages and adjustable against the action of a restoring force, and means to vary the stepless regulating system in the opposite sense as to the stepwise regulating system during the transistor thereof from one regulating stage to the next, whereby the restoring force is varied so as to avoid overriding and oscillations and to maintain the capacity during the transition from one regulating stage to the next practically at a constant level, a control appliance for the step by step variation of the capacity of the constant speed compressor and a regulating device adjustable against the action of a restoring force for the infinitely variable regulation of the quantity to be delivered within the individual regulating stages, a device for the variation of the restoring force whereby the regulating device for the infinitely variable regulation of the quantity to be delivered is connected to the device, said device being controlled by the control appliance for the step by step variation of the capacity of the constant speed compressor.

4. A system for the infinitely variable capacity control of constant speed compressors, the combination of a stepwise regulating system comprising at least two regulating stages and a stepless regulating system effective within the individual stages and adjustable against the action of a restoring force, and means to vary the stepless regulating system in the opposite sense as to the stepwise regulating system during the transition thereof from one regulating stage to the next, whereby the restoring force is varied so as to avoid overriding and oscillations and to maintain the capacity during the transition from one regulating stage to the next practically at a constant level, a control appliance for the step by step variation of the capacity of the constant speed compressor and a regulating device adjustable against the action of a restoring force for the infinitely variable regulation of the quantity to be delivered within the individual regulating stages, a device for the variation of the restoring force whereby the regulating device for the infinitely variable regulation of the quantity to be delivered is connected to the device, said device being controlled by the control appliance for the step by step variation of the capacity of the constant speed compressor, the device for the variation of the restoring force comprising a plurality of pressure chambers equal in number to the regulating stages and to be impinged upon by a control pressure by means of the said control appliance, and each chamber being provided with a closing diaphragm attached to a common connecting element acting upon the regulating device for the infinitely variable regulation of the delivery of the constant speed compressor.

5. A system for the infinitely variable capacity control of constant speed compressors, the combination of a stepwise regulating system comprising at least two regulating stages and a stepless regulating system effective within the individual stages and adjustable against the action of a restoring force, and means to vary the stepless regulating system in the opposite sense as to the stepwise regulating system during the transition thereof from one regulating stage to the next, whereby the restoring force is varied so as to avoid overriding and oscillations and to maintain the capacity during the transition from one regulating stage to the next practically at a constant level, a control appliance for the step by step variation of the capacity of the constant speed compressor and regulating device adjustable against the action of a restoring force for the infinitely variable regulation of the quantity to be delivered within the individual regulating stages, a device for the variation of the restoring force whereby the regulating device for the infinitely variable regulation of the quantity to the delivered is connected to the device, said device being controlled by the controll appliance for the step by step variation of the capacity of the constant speed compressor, the device for the variation of the restoring force comprising a plurality of pressure chambers equal in number to the regulating stages and to be impinged upon by a control pressure by means of the said control appliance, and each chamber being provided with a closing diaphragm attached to a common connecting element acting upon the regulating device for the infinitely variable regulation of the delivery of the constant speed compressor, and an equalizing chamber communicating with the atmosphere and provided between two pressure chambers.

6. A system for the infinitely variable capacity control of constant speed compressors, the combination of a stepwise regulating system comprising at least two regulating stages and a stepless regulating system effective within the individual stages and adjustable against the action of a restoring force, and means to vary the stepless regulating system in the opposite sense as to the stepwise regulating system during the transition thereof from one regulating stage to the next, whereby the restoring force is varied so as to avoid overriding and oscillations and to maintain the capacity during the transition from one regulating stage to the next practically at a constant level, a control appliance for the step by step variation of the capacity of the constant speed compressor and a regulating device adjustable against the action of a restoring force for the infinitely variable regulation of the quantity to be delivered within the individual regulating stages, a device for the variation of the restoring force whereby the regulating device for the infinitely variable regulation of the quantity to be delivered is connected to the device, said device being controlled by the control appliance for the step by step variation of the capacity of the constant speed compressor, the device for the variation of the restoring force comprising a plurality of pressure chambers equal in number to the regulating stages and to be impinged upon by a control pressure by means of the said control appliance, and each chamber being provided with a closing diaphragm attached to a common connecting element acting upon the regulating device for the infinitely variable regulation of the delivery of the constant speed compressor, said regulating device being in the form of a spring-loaded by-pass valve actuated from the delivery side of the constant speed compressor, with the said diaphragms being attached to the valve stem of said by-pass valve, and said by-pass valve being loaded by the spring in the closing direction.

7. A system for the infinitely variable capacity control of constant speed compressors, the combination of a stepwise regulating system comprising at least two regulating stages and a stepless regulating system effective within the individual stages and adjustable against the action of a restoring force, a control appliance and a regulating device in the system, and means to vary the stepless regulating system in the opposite sense as to the stepwise regulating system during the transition thereof from one regulating stage to the next whereby the restoring force is varied so as to avoid overriding and oscillations and to maintain the capacity during the transition from one regulating stage to the next practically at a constant level, and throttles to delay the pressure variation for the operation of the control appliance and of the regulating device.

8. A system according to claim 7, in which the said throttles are manually adjustable.

References Cited by the Examiner
UNITED STATES PATENTS

| | | | |
|---|---|---|---|
| 858,470 | 7/1907 | Richards | 230—22 |
| 1,759,617 | 5/1930 | Hoerbiger | 230—22 |
| 2,170,358 | 8/1939 | Wainwright | 230—26 |
| 2,372,923 | 4/1945 | Yerger | 230—26 |
| 2,733,660 | 2/1956 | Towle et al. | |
| 2,791,179 | 5/1957 | Dorer. | |
| 2,922,372 | 1/1960 | Dorer. | |

MARK NEWMAN, *Primary Examiner.*

LAURENCE V. EFNER, *Examiner.*

G. M. THOMAS, W. J. KRAUSS, *Assistant Examiners.*